May 15, 1951  H. W. SCHULTZ  2,553,215
FRICTION MATERIAL
Filed Nov. 25, 1946
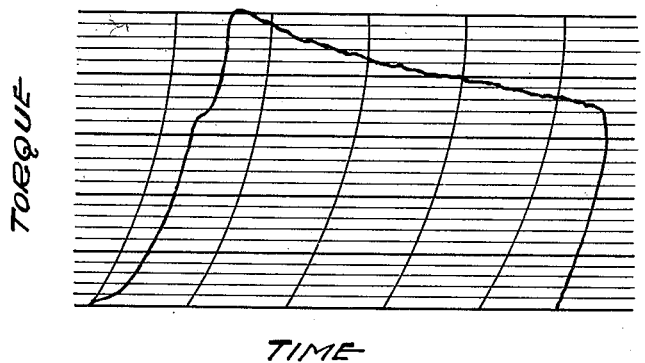
INVENTOR.
HAROLD W. SHULTZ
BY
Spencer Hardman & John
his ATTORNEYS Patented May 15, 1951

2,553,215

UNITED STATES PATENT OFFICE 2,553,215

FRICTION MATERIAL

Harold W. Schultz, Dayton, Ohio, assignor to General Motors Corporation, Detroit, Mich., a corporation of Delaware Application November 25, 1946, Serial No. 712,101

2 Claims. (Cl. 260—17.2)

This invention relates to friction material and is particularly concerned with friction facings for use in wet clutches.

Wet clutches, that is, clutches running in oil or other fluids, present peculiar problems which do not arise with normally dry clutches. This may be explained by the fact that when a wet clutch begins to engage, the fluid acts as a cushion between the clutch plates. This fluid must be properly disposed of or a slippage occurs which persists over an appreciable period of time. When ducts are provided in the facings for leading the fluid away from the facing during engagement thereof, the cost of the clutch is increased and in many cases, the control of the removal of fluid is not sufficiently accurate to permit smooth engagement of the clutch members.

Wet clutches have definite advantages in that the operation thereof is generally smoother than with a dry clutch since the fluid provides a cushioning effect. Further the presence of fluid maintains the clutch plates relatively cooler and increases the life thereof. For these reasons, a wet clutch has advantages which far outweigh its disadvantages, which primarily are directed to the cost.

I have formulated a material for use in a friction facing used in connection with a wet clutch which has all of the desired frictional characteristics and which also acts as a metering means per se for permitting controlled flow of the fluid from between the clutch plates during engagement thereof. This is accomplished through the use of a porous material in the facing per se which porous material retards the flow of fluid therethrough due to its peculiar nature but simultaneously permits a controlled flow that provides for a cushioned engagement of the plates that is very smooth in operation and which permits full engagement within a relatively short period of time whereupon substantially all of the fluid is removed from between the plates.

The facing is a formulation of the various materials to be described in detail hereinafter which may be molded and bonded to a metal backing member for strength and rigidity and which have a relatively smooth surface at the friction facing thereof free from oil grooves or indentation, either helical or radial, which eliminates considerable accurate machining heretofore found necessary. It is therefore the primary object of this invention to provide a facing material for use in a wet clutch, or the like, which has the desired frictional characteristics together with a controlled porosity which permits metering of a fluid therethrough.

A further object of the invention is to provide a method for forming said friction material wherein the porosity or metering action is assured through the precoating of the porous material used in the friction material with a predetermined quantity of binder prior to its incorporation with the remainder of the ingredients used in the complete mixture.

Another object of the invention is to provide a clutch facing material which may be molded and which includes cotton fiber or flock, ground cork, a binder having thermosetting properties and a friction fortifying agent.

In carrying out the above object, it is a further object in some cases to use asbestos fiber and/or leather fiber as a substitute for the cotton flock or in some cases in combination therewith.

Further objects and advantages of the present invention will be apparent from the following description, reference being had to the accompanying drawing wherein preferred embodiments of the present invention are clearly shown.

In the drawing:

The drawing shows a characteristic torque-time curve for the preferred friction facing composition.

In the formation of friction material under the teachings of this disclosure, I pre-mix a binder with the other ingredients in separate batches whereby a predetermined quantity of binder material is present adjacent the several ingredients which assures the proper distribution thereof in the final article. In the preferred embodiment of the invention, cotton flock or fiber is used as the porous element of the facing. This cotton flock is coated with a binder having thermosetting properties and in a fluid form whereby each fiber of the flock is coated and is bound to the crossing-over portions of the adjacent fibers. In this manner a porous matrix is formed which will permit a definite and metered flow of fluid therethrough when the porous material is incorporated in the facing.

The other major ingredient of the facing is granulated or ground cork which is likewise pre-mixed with the binder in somewhat different quantities after which the cork and the cotton are mixed when dry to form a homogeneous mass to which may be added a friction-fortifying material. This mixture is then molded and heated to a temperature sufficient to cause partial polymerization thereof; that is to say, sufficient polymerization to hold the molded article together.

The next step is to place the molded facing on a cement coated steel disc or backing plate and heat under pressure to a temperature sufficient to bond the facing to the plate and simultaneously to complete the polymerization of the binder used in the facing material.

More specifically, one form of the invention may be prepared as follows:

100 parts cotton flock is mixed thoroughly with 90 parts of a 20% (solids) solution of a phenol formaldehyde resin, and allowed to air dry for about one hour after which it is dried at 200° F. for 30 minutes.

100 parts of granulated cork is thoroughly mixed with 50 parts of 20% (solids) solution of phenol-formaldehyde resin and is allowed to air dry for one hour after which it is dried at 200° F. for 30 minutes.

(All proportions expressed as parts by weight.)

These two compounds form the basis of the friction material and in the final compounding the proportions are 20 parts of prepared flock to 10 parts of prepared cork together with about three parts of a friction-fortifying material, preferably Cardolite dust (cashew nut resin). "Cardolite" is a trade name of a product made and marketed by the Irvington Varnish Company. It is essentially a dust made from polymerized cashew nut shell liquid (anacardic acid) and is available on the market in various grades of hardness, ranging from a rubbery consistency to a hard particle. All grades are suitable for friction fortification, according to the specific requirements of the application. This mixture is molded and cured for thirty minutes at 225° F. to form a facing which may then be placed on a metal backing that has preferably previously been given a coat of conventional cement whereupon the assembly is heated under pressure for 45 minutes at from 300–315° F. to effect the final cure and bond.

The above formula is the preferred form of the invention. It should be understood that the prepared mixture of cork and cotton flock may vary from 10 to 50 parts of cork to from 90 to 50 parts of flock. Likewise the friction-fortifying material may vary from 0 to 20 parts. In the matter of the binder, this may vary from between 15 to 20 parts of resin which is preferably made up into a 20% (solids) solution for use with the flock. In the preparation of the cork, the resin may vary from 5–15 parts made up as a 20% (solids) solution. The total resin content obtained by adding the resin used in the cork and flock formulations yields a range of total resin of from 20 to 35 parts by weight (solids).

In place of Cardolite dust, other friction-fortifying or friction stabilizing agents, as they are termed, such as lead sulphide, carbon, metal powder, various salts or mixture thereof, etc., may be used in order to control the frictional characteristics of the finished product. In place of cotton fiber, I have found that asbestos fiber or leather fiber may be used either in part or in whole as is desired, which ingredients are preheated with the resin solution in the manner already explained in connection with the cotton fiber.

The temperature control in the various drying and curing steps may also vary through wide ranges. For example, in the preparation step of both the flock and the cork, air drying may be used entirely, dependent on time. Obviously, the 200° oven drying accelerates the operation but since no appreciable polymerization is necessary or desired the temperature of this step must be kept relatively low. In the second step, that is, the molding of the facing material, the temperature should be held to between 200–225° F. This step is more critical since too high a temperature will cause the binder to pass through a critical stage of polymerization and in this particular step only partial polymerization is desired. The final curing step, which is accomplished simultaneously with the bonding of the facing on the backing plate, may be performed at temperatures of 285–325° F., which are conventional temperatures for complete polymerization for phenol formaldehyde type resins.

In this connection, in place of phenol formaldehyde resin, cresol formaldehyde, or urea formaldehyde types of resin may be used. Likewise other resins, either thermosetting or thermoplastic, may be used if they will withstand the temperature of operation and will, upon final curing, have thermosetting properties either through polymerization or through mechanical vulcanization. The temperature of the plate during service is probably in the neighborhood of 350° F. at the surface since the oil in which the clutch runs is normally maintained at a temperature of 250° F. Thus any binder utilized must not soften at the temperature of operation and this is about the only limitation with respect to the binder.

In the material described herein, the cotton fibers act as the metering means to bleed off oil normally present at the engaging surfaces whereby a cushioned engagement of the plates is obtained. It is apparent that considerable porosity must remain in the fiber portion of the facing to accomplish the end desired and it is for this reason that the preparation step of the fiber is important and should be accomplished separately from the preparation step of the cork. In other words, the separate mixing of the binder in predetermined quantities with the cork and with the fiber before the final mass is mixed is highly desirable since the control thus obtained permits the correct porosity in the final plate after fabrication of the facing.

The accompanying curve shows torque plotted against time. The area under the curve is the total work expended upon initial engagement of clutch plates until the two plates are rotating without slip and at the same speed. The curve shows a low and constant torque buildup through this period which is desirable over erratic and fast buildups since operation is smooth and free from grabbing.

While the embodiments of the present invention as herein disclosed, constitute preferred forms, it is to be understood that other forms might be adopted, all coming within the scope of the claims which follow.

What is claimed is as follows:

1. A molded composition of matter for use as a wet clutch facing material comprising fiber, taken from the class consisting of cotton flock, leather fiber and asbestos fiber, 90 to 50 parts, ground cork 10 to 50 parts, a friction-fortifying material up to 20 parts consisting of dust made from polymerized cashew nut shell oil, and a binder for the whole in quantities of from 20 to 35 parts (solids), said resin being taken from the class consisting of phenol formaldehyde resin, cresol formaldehyde resin and urea formaldehyde resin of 350° F., said facing having a predetermined degree of porosity which permits controlled flow of fluid therethrough.

2. A molded composition of matter for use in wet clutch facing material comprising a molded mixture of; cotton fiber 20 parts, granulated cork 10 parts, dust made from polymerized cashew nut shell oil 3 parts, and a phenol formaldehyde binder in quantities of from 20 to 35 parts (solids), said facing having a predetermined degree of porosity which permits flow of fluid therethrough.

HAROLD W. SCHULTZ.

REFERENCES CITED

The following references are of record in the file of this patent:

UNITED STATES PATENTS

| Number | Name | Date |
| --- | --- | --- |
| 1,436,153 | Fisher | Nov. 21, 1922 |
| 1,472,147 | Bastian | Oct. 30, 1923 |
| 2,165,140 | Harvey | July 4, 1939 |
| 2,185,333 | Denman | Jan. 2, 1940 |
| 2,256,646 | Kuzmick | Sept. 23, 1941 |
| 2,327,785 | Harvey | Aug. 24, 1943 |
| 2,406,653 | Batchelor | Aug. 27, 1946 |